(12) United States Patent
Harvey

(10) Patent No.: US 9,751,991 B1
(45) Date of Patent: Sep. 5, 2017

(54) RENEWABLE RESINS AND THERMOPLASTICS FROM EUGENOL

(71) Applicant: The United States of America as Represented by the Secretary of the Navy, Washington, DC (US)

(72) Inventor: Benjamin G. Harvey, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 253 days.

(21) Appl. No.: 14/688,109

(22) Filed: Apr. 16, 2015

(51) Int. Cl.
*C08J 3/20* (2006.01)

(52) U.S. Cl.
CPC ........... *C08J 3/203* (2013.01); *C08J 2369/00* (2013.01)

(58) Field of Classification Search
CPC ....................................................... C08J 3/203
See application file for complete search history.

(56) References Cited

U.S. PATENT DOCUMENTS

| | | | | |
|---|---|---|---|---|
| 2013/0130345 A1* | 5/2013 | Thai | ......... | C07C 1/247 435/166 |
| 2014/0296444 A1* | 10/2014 | Chisholm | ............ | C08F 16/32 525/328.9 |
| 2016/0160097 A1* | 6/2016 | Waite | ................ | C07F 7/1852 526/279 |

OTHER PUBLICATIONS

Blackwell, et al, New approaches to olefin cross-metathesis, J. Am. Chem. Soc. 2000, 122, 58-71.

Hagenaars, et al. Prep. fract'n & charact'n of polycarbonate/eugenol-siloxane copolymers, Polymer 43 (2002) 2663-2669.

Rojo, et al. From natural products to polymeric deriv of "eugenol": a new approach for prep. of dental of dental comp & orthopedic bone cements, Biomacro. 2006, 7, 2751-2761.

Runge, et al., New select. from old catalysts. Occ. of Grubbs catalysts in PDMS to change their reactions. J. of Ogan. Chem 691 (2006) 5278-5288.

Sweileh, et al. Synth. & charact. of polycarb. by MPIR of alkylene & arylene diacetates w/alkylene & arylene diphenyl dicarb. Mole. 2010, 15, 3661-3682.

Gunther, et al. ADMET-polymeration of dienes based on sustainable chemicals, Macromol. Symp. 2010, 293, 15-19.

Harvey, et al. Synth. & charact. of a renewable cyanate ester/polycarbonate network derived from eugenol. Polymer 55 (2014) 5073-5079.

Harvey, et al. A high-performance renewable thermosetting resin derived from eugenol, submitted to ChemSusChem for publication.

* cited by examiner

*Primary Examiner* — Megan McCulley
(74) *Attorney, Agent, or Firm* — Charlene A. Haley

(57) ABSTRACT

An eugenol, an abundant natural phenol and the primary component of clove oil, which is converted to a thermoset resin via a high yield, two-step reaction. Modest heating yields a thermoset material with thermal stability above 350° C., a glass transition temperature of 187° C. and water uptake of only 1.8%.

23 Claims, 6 Drawing Sheets

RENEWABLE RESINS AND THERMOPLASTICS FROM EUGENOL

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to eugenol, an abundant natural phenol and the primary component of essential oils (clove oil), which is converted to a thermoset resin via a high yield, two-step reaction. Modest heating yields a thermoset material with thermal stability above 350° C., a glass transition temperature of 187° C. and water uptake of only 1.8%. Eugenol can be converted to a variety of thermosetting resins including epoxies, and cyanate esters. Eugenol can also be converted to thermoplastics including polycarbonates, polyether ether ketone (PEEK) and polysulfones.

Figure 1:
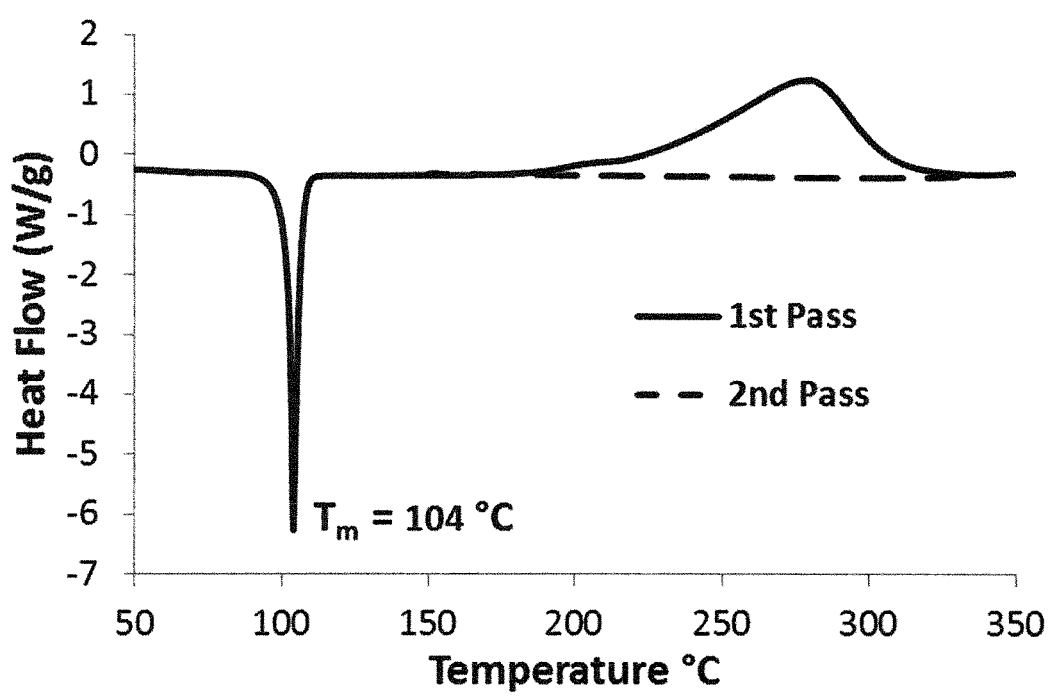
FIG. 1 is a graph showing the DSC trace of the cyanate ester, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

The invention generally relates to eugenol, an abundant natural phenol and the primary component of essential oils (clove oil), which is converted to a thermoset resin via a high yield, two-step reaction. Modest heating yields a thermoset material with thermal stability above 350° C., a glass transition temperature of 187° C. and water uptake of only 1.8%. Eugenol can be converted to a variety of thermosetting resins including, but not limited to: epoxy and cyanate ester resins. Eugenol can also be converted to thermoplastics including, but not limited to polycarbonates, polyether ether ketones (PEEK), and polysulfones.

Naturally occurring phenols that can be readily derived from essential oils or high volume components of biomass, such as lignin, are compelling feedstocks for the generation of full performance resins and polymers. In some cases the structural diversity of these phenols allows for powerful and efficient synthetic methods to be utilized with benefits including selectivity, improved carbon efficiency, and unique electronic and steric interactions. Eugenol, a phenol which comprises approximately 80% of clove oil embodies this class of renewable phenols. The terminal olefin provides a synthetic handle for polymerization and chemical modification, while the aliphatic chain and methoxy group greatly impact the physical properties of polymers derived from eugenol.

A variety of polymers have been prepared from eugenol based monomers. Polyacetylenes have been synthesized from a monomer generated by reaction of propargyl chloride with eugenol. (Rahim, E. A.; Sanda, F.; Masuda, T. J. *Macromolec. Sci. Part A* 2004, A41, 133-141; Rahim, E. A.; Sanda, F.; Masuda, T. J. *Polym. Bull.* 2004, 52, 93-100). Co-polymers comprised of BPA polycarbonate and eugenol/siloxane blocks have also been extensively studied. (Hagenaars, A. C.; Bailly, Ch.; Schneider, A.; Wolf, B. A. *Polymer* 2002, 43, 2663-2669) More recently, methacrylic derivatives of eugenol have been used as components of dental composites and bone cements. (Rojo, L.; Vazquez, B.; Parra, J.; Bravo, A. L.; Deb, S.; San Roman, J. *Biomacromolecules* 2006, 7, 2751-2761)

An important consideration when developing synthetic methodology for the preparation of molecules derived from renewable materials is the ability to utilize efficient and selective catalysts. In cases where alkenes are available for reaction, olefin metathesis can be a powerful technique for selectively generating new carbon-carbon bonds. The self-metathesis of eugenol with 1st and 2nd generation Grubbs' catalysts has been described, (Blackwell, H. E.; O'Leary, D. J.; Chatterjee, A. K.; Washenfelder, R. A.; Bussmann, D. A.; Grubbs, R. H. *J. Am. Chem. Soc.* 2000, 122, 58-71; Runge, M. B.; Mwangi, M. T.; Bowden, N. B. *J. Organomet. Chem.* 2006, 691, 5278-5288) as have a number of cross-metathesis reactions. As an extension of this chemistry, a variety of bifunctional monomers containing eugenol moieties have been prepared with various linkers including butyl, decyl, carbonate, or glycol. The pendant olefins could then be polymerized by self-metathesis (Giinther, S.; Lamprecht, P.; Luinstra, G. A. *Macromol. Symp.* 2010, 293,15-19). Despite the significant amount of work conducted on eugenol polymers, there are no reports on the use of the reduced self-metathesis product of eugenol, 4,4'-(butane-1,4-diyl)bis(2-methoxyphenol), as a precursor to thermoplastics or other resins such as cyanate esters. This bisphenol has a number of advantages over common resin precursors such as bisphenol A given the low toxicity of eugenol and the relatively long aliphatic chain between phenols. The increased distance between phenols is expected to decrease the activity of the molecule as an endocrine disruptor. Moreover, the presence of ortho-methoxy groups may disrupt hydrogen bonding interactions that are essential for efficient bonding of phenols to receptor active sites. Recently, a significant amount of work by our group has been conducted on cyanate esters derived from renewable phenols. Cyanate esters are of particular interest due to their high glass transition temperatures, processability, low water uptake, and excellent FST (Flame, Smoke and Toxicity) properties. Embodiments of the invention describe methods for the synthesis and characterization of thermosetting resins and thermoplastics from the abundant biofeedstock eugenol. The cure behavior of the resin and its fundamental properties are then described.

The coupling of eugenol via olefin metathesis was accomplished with the 1$^{st}$ generation Grubb's catalyst utilizing a modest, 1% catalyst loading (Chemical Schematic 1). A variety of other olefin metathesis catalysts based on and including, but not limited to, Ru, Mo, W, or Re can be used to facilitate this transformation. In embodiments the reaction is conducted without solvent. In embodiments the reaction is conducted in an organic solvent. Ethylene is generated as a byproduct of the reaction and in embodiments of the invention, ethylene can be removed under reduced pressure or other means including active sparging with an inert gas, or reflux under an inert gas. In other embodiments the ethylene is collected. Yields of the coupled alkene (93%) were significantly higher than that reported in the literature (71%), perhaps due to the scale of the reaction or the work-up procedure which included a base extraction of the phenol. (Blackwell, H. E.; O'Leary, D. J.; Chatterjee, A. K.; Washenfelder, R. A.; Bussmann, D. A.; Grubbs, R. H. *J. Am. Chem. Soc.* 2000, 122, 58-71). In embodiments, when a ruthenium based catalyst is used for the metathesis reaction, the catalyst is also used as the hydrogenation catalyst to reduce the unsaturated bisphenol. In embodiments, an additional hydrogenation catalyst based on metals including, but not limited to, Ni, Pd, Pt, Cu, or Ru is added to the reaction mixture to increase the rate of the subsequent hydrogenation. In embodiments the metathesis catalyst is heterogeneous and is removed by filtration and reused in subsequent preparations. The product could be effectively purified by base extraction followed by reprecipitation, while analytically pure material could be obtained by standard techniques.

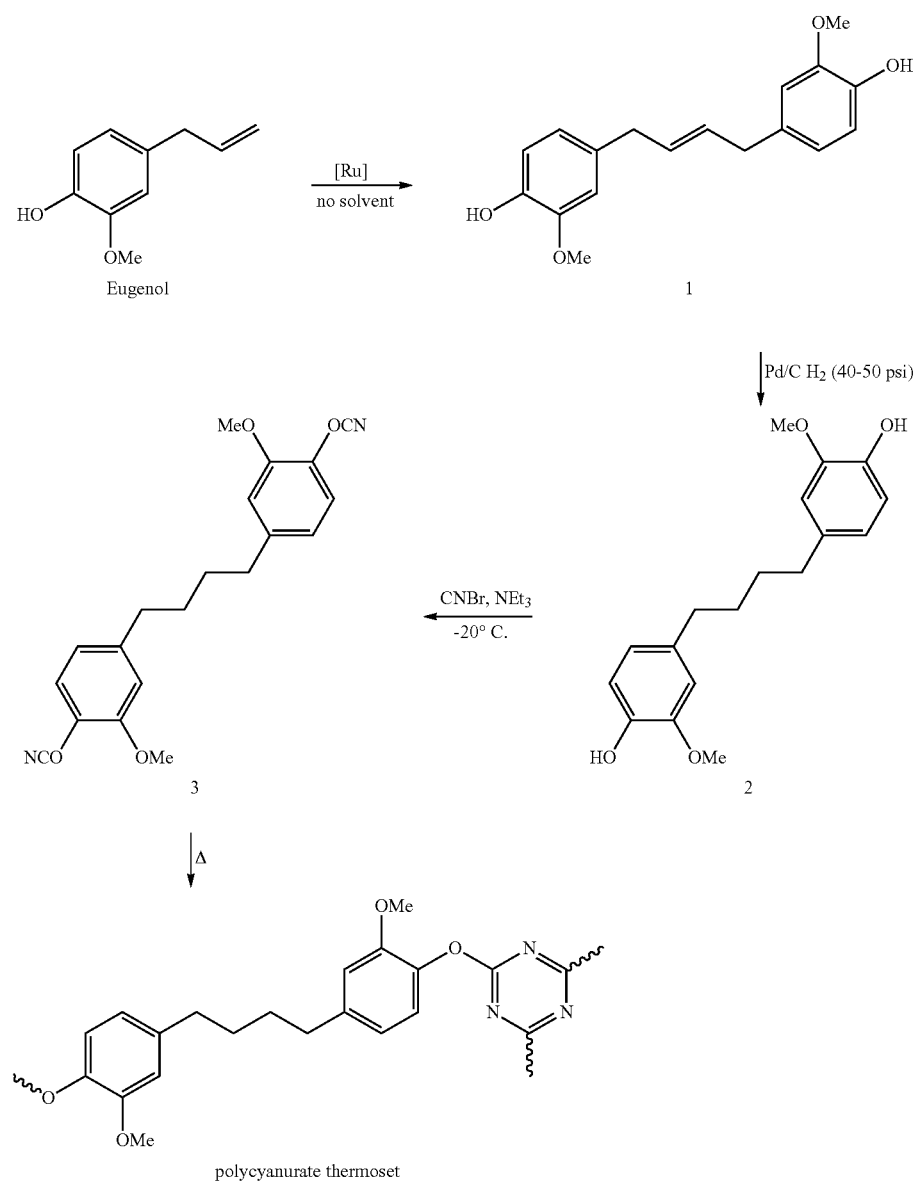

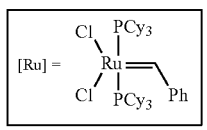

Chemical Schematic 1. Synthesis of a Cyanate Ester Resin and Thermoset Network from Eugenol Synthesis of a cyanate ester from the bisphenol is straightforward. Although the bisphenol showed low solubility in ether solutions, a mixture of ether and acetone effectively dissolved the bisphenol but was not an effective solvent for the product cyanate ester. This allowed for collection of the crude product by filtration. Residual salts were removed with a water wash and the desired product was produced in high purity and yield by recrystallization from ethyl acetate.

The $^1$H and $^{13}$C NMR spectra of the compounds were consistent with their structures, but to further characterize the compounds, the single crystal X-ray structures of both the bisphenol and the cyanate ester were determined (Chemical Schematic 2). The crystal packing of the bisphenol is affected by several hydrogen bonding interactions. These interactions include an intramolecular hydrogen bond between the hydroxyl and methoxy groups with a distance of 2.22 Å. This strong hydrogen bonding interaction results in orientation of the hydroxyl hydrogen toward the methoxy group. Three additional intermolecular hydrogen bonds of 2.29, 2.31, and 2.71 Å tie neighboring phenols together into a 3-dimensional lattice. As expected, the 4-carbon group between aromatic rings is in the anti-configuration which results in the aromatic rings being nearly parallel with an inter-ring angle of less than one degree. No evidence was observed for non-classical bonding interactions or I-stacking. The structure of the cyanate ester shares many of the structural features of the bisphenol. The same anti-configuration is observed for the 4-carbon group between the aromatic rings, but the chain is disordered suggesting that another conformation is also present in the crystal lattice. The aromatic rings are parallel with an inter-ring angle of zero degrees.

Figure 2:
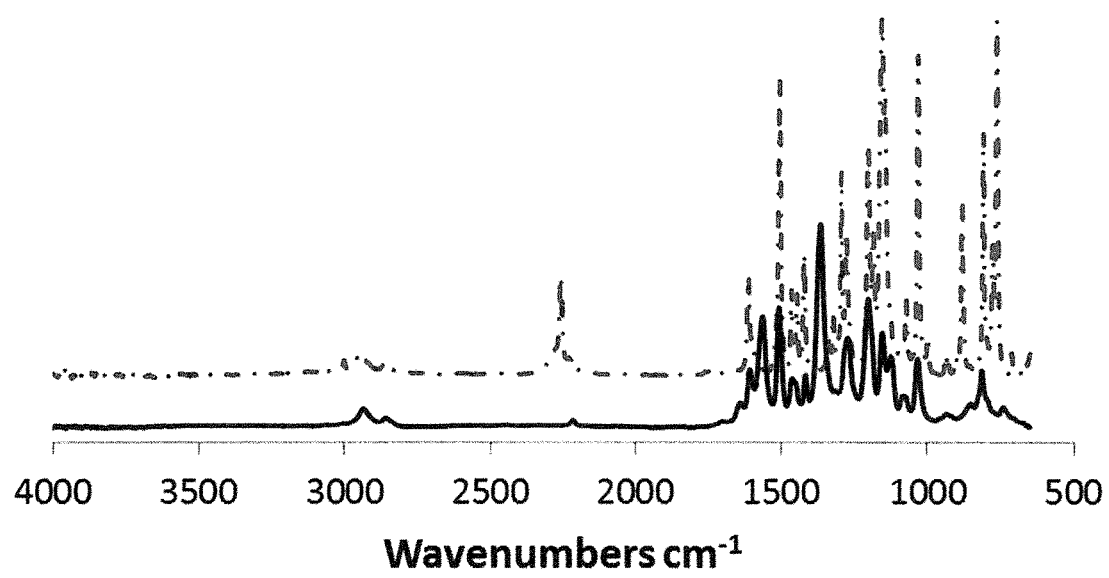
FIG. 2 is a graph showing the IR spectra for the cyanate ester resin and cured thermoset, according to embodiments of the invention.

After the cyanate ester was fully characterized it became of interest to examine the cure chemistry of the resin by DSC (FIG. 1). The resin exhibited a sharp melting point at 104° C. and a broad exotherm from 182-325° C. This results in a processing window of nearly 80° C., which allows for simplified fabrication of composite materials. The enthalpy of reaction was 201.2 kJ/mole or 100.6 kJ/mole (—OCN) which is consistent with complete conversion of the cyanate esters to cyanurate rings. A standard cure protocol (150° C. for 1 h, 210° C. for 24 h) was employed to generate a fully cured resin puck for further analysis. The degree of cure was qualitatively evaluated by comparing the IR spectra of the starting cyanate ester and the cured resin (FIG. 2). Disappearance of the strong C—N stretch at 2253 cm$^{-1}$ along with appearance of the cyanurate ring bands at 1608 and 1364 cm$^{-1}$ confirmed that the cyanate ester cured completely under the applied protocol. In addition, DSC analysis of the cured sample showed no residual exotherm (FIG. 1) providing further evidence that complete cure had been achieved.

Figure 3:
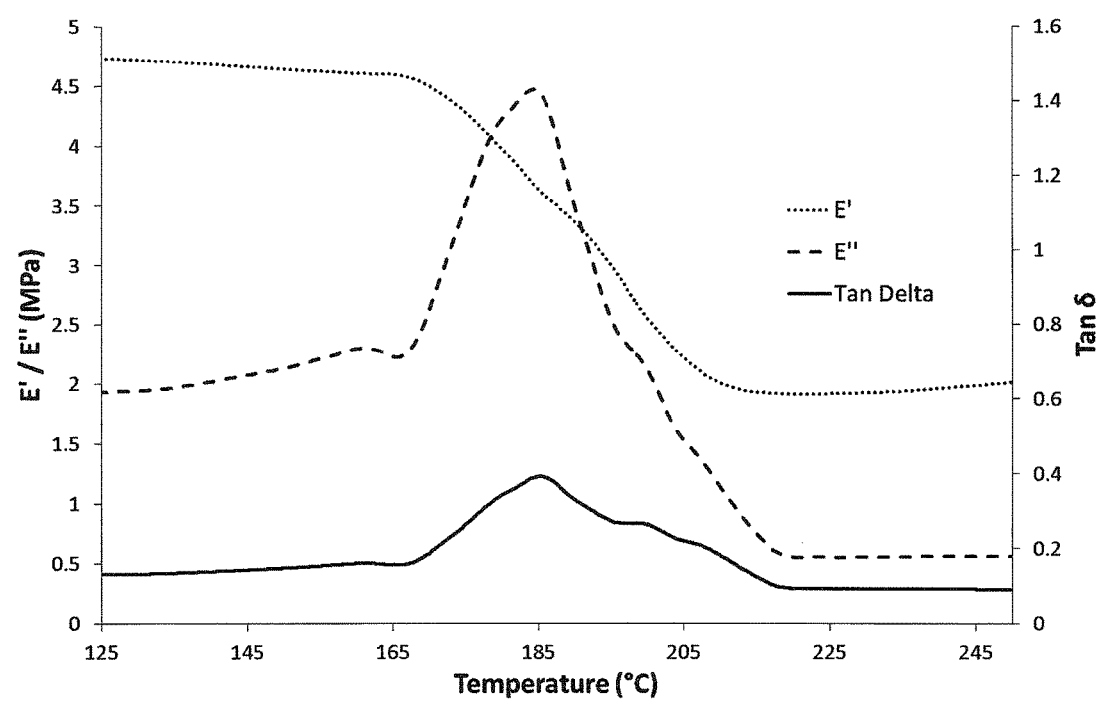
FIG. 3 is a graph showing the TMA data illustrating the glass transition temperature of the cyanate ester thermoset, according to embodiments of the invention.

The glass transition temperature of the cured resin was measured by TMA. The $T_g$ (tan δ) was 186° C. (FIG. 3) which is relatively low compared to more rigid cyanate esters, but is competitive with high-temperature epoxyresins. Compared to conventional bis-cyanate esters that typically have a more rigid one-carbon bridge between the aromatic rings, the 4-carbon chain between the aromatic rings in compound 3 lowers the $T_g$ of the thermoset. However, the structural flexibility of the aliphatic chain imparts unique properties to the resin. One of the key advantages of cyanate esters over other thermoset resins is their relatively low water uptake and excellent stability to hydrolysis reactions. Particularly for maritime environments, these characteristics can be vital to long term performance. To evaluate the effect of water on the glass transition temperature and thermal stability of this resin, a cured resin puck was immersed in 85° C. water for 96 hours. The water uptake was only 1.8% which is substantially less than the completely cured cyanate ester derived from bisphenol A (BADCy) at nearly 3% and also less than fully cured dicyanate esters derived from creosol. The "wet" $T_g$ for this material was then determined by an additional TMA study and showed a decrease in $T_g$ of only 19° C. Thus, the "wet" $T_g$ indicates performance comparable to the dry $T_g$s of the highest performing aerospace grade epoxy resins.

Figure 4:
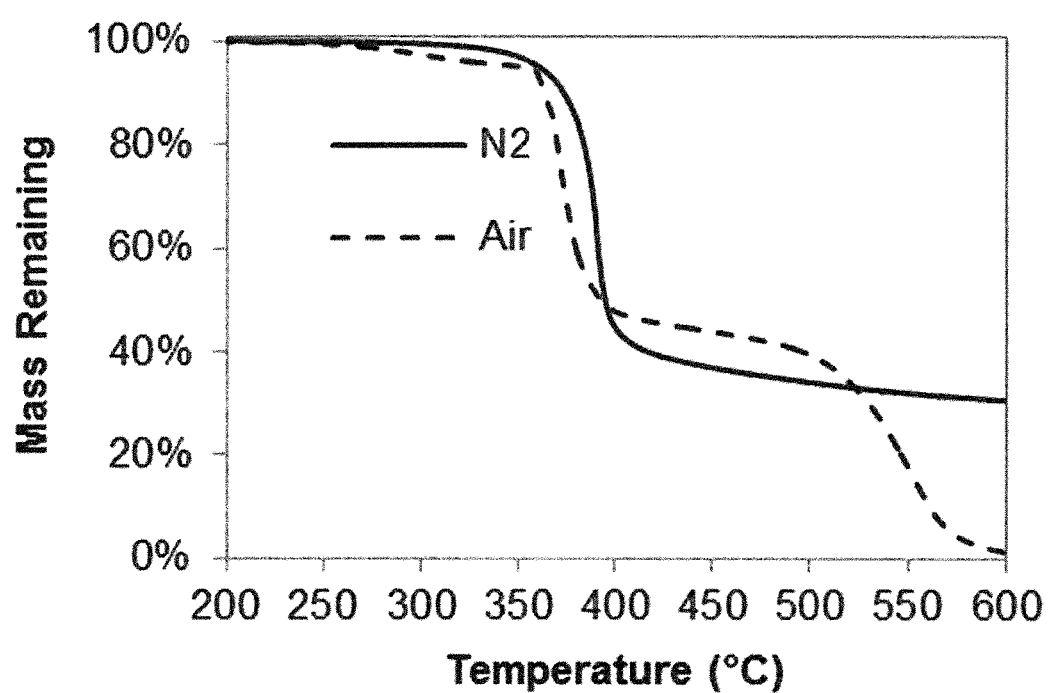
FIG. 4 is a graph showing the TGA data for the fully cured cyanate ester resin, according to embodiments of the invention.

To further characterize the thermal stability of the cured resin, TGA experiments were conducted in $N_2$ and air (FIG. 4). In $N_2$ the material was stable up to ~350° C. with 5% weight loss at 360° C. and 10% weight loss at 374° C. The char yield (measured at 600° C.) was 31%. This number, although relatively low for cyanate ester thermosets, is not surprising given the extra mass of thermally labile moieties including the methoxy and aliphatic bridging groups. A simple calculation based only on the number of aromatic carbons and assuming that the cyanurate rings decompose completely to cyanuric acid would give a theoretical char yield of only 41%. Based on this, the cyanate ester produces 75% of the expected char which is similar to the results from BADCy. When the thermal analysis is conducted in air, the material exhibits some unique behavior. From about 400-525° C. the char yield in air is actually higher than in $N_2$, but the mass then rapidly decreases to zero at 600° C., suggesting that a partial oxidation reaction at ~400° C. increases the mass of the residue but then renders the material unstable at higher temperatures. FIG. 4. TGA data for the fully cured cyanate ester resin.

Figure 5:
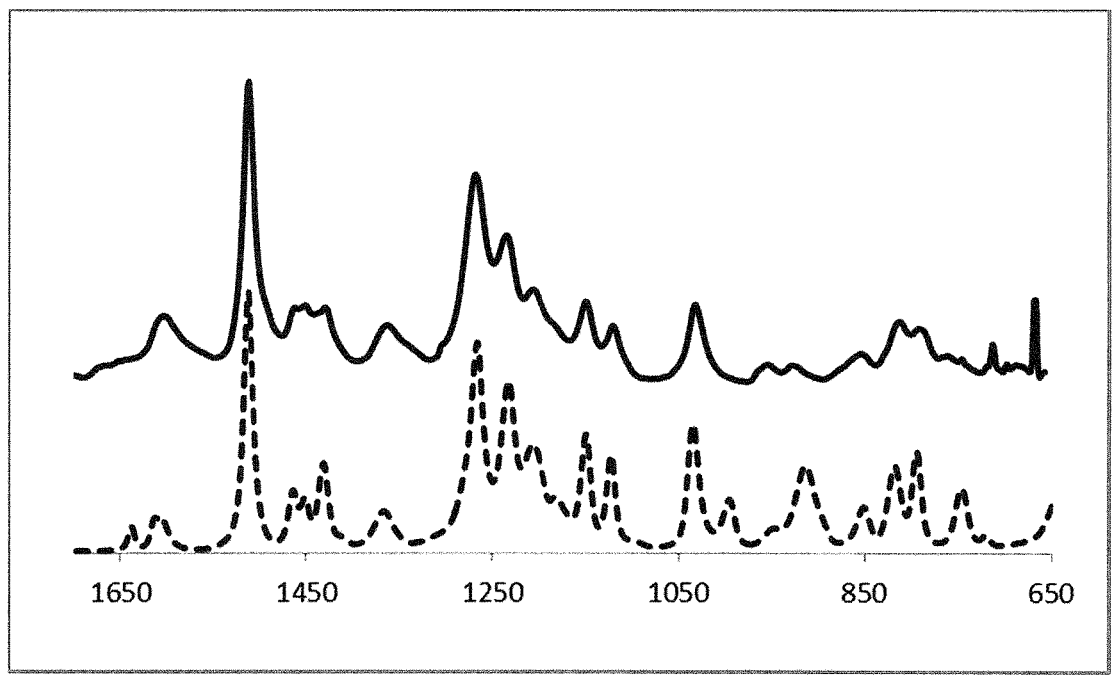
FIG. 5 is a graph showing the comparison of IR spectra of eugenol and the gaseous decomposition products derived from the cured cyanate ester at 416° C., according to embodiments of the invention.
Figure 6:
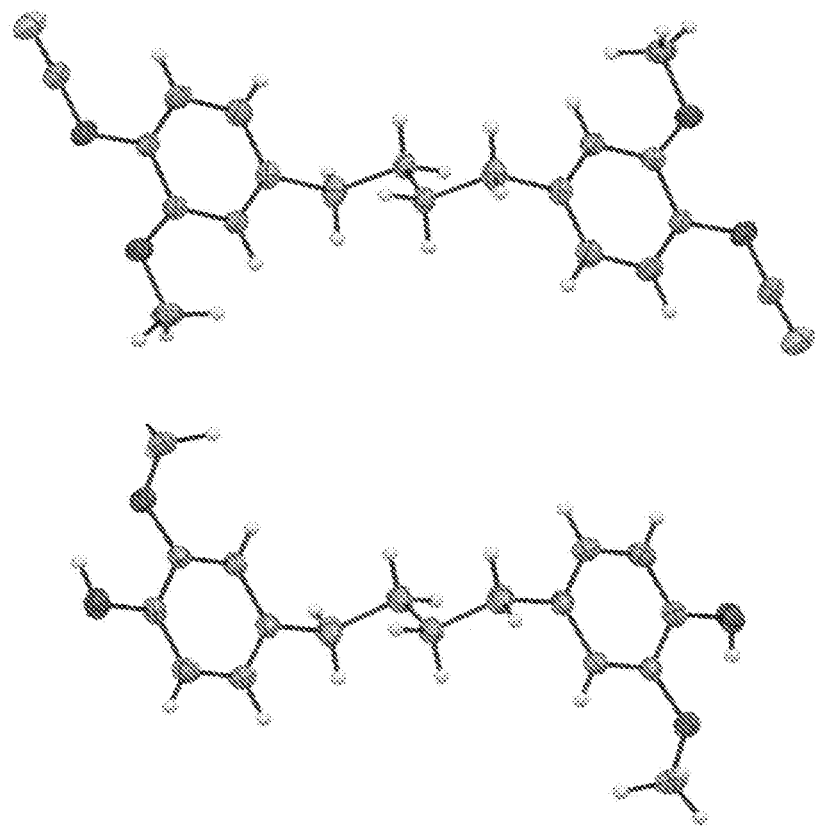
FIG. 6 is a chemical schematic showing X-ray crystal structures of the saturated bisphenol (top and analogous cyanate ester (bottom) derived from eugenol, according to embodiments of the invention.

FIG. 5. Comparison of IR Spectra of Eugenol (Blue) and the IR Spectrum of Gaseous Decomposition Products Derived from the Cured Cyanate Ester at 416° C.

In light of the TGA data, it was of interest to gain a qualitative understanding of the decomposition mechanism for the cyanate ester. The decomposition was probed by means of an inline IR spectrometer coupled to a pyrolysis chamber. A gas phase spectrum captured at 416° C. showed evolution of phenolic compounds and isocyanic acid. The spectrum was remarkably similar to that for eugenol (FIG. 5), suggesting that decomposition proceeds by cleavage of the aliphatic carbon bridge with concomitant conversion of the cyanurate ring systems to isocyanic acid. The generation of eugenol and related phenols is particularly interesting from a sustainability perspective. In embodiments of the invention thermoset materials can be effectively recycled by controlled pyrolysis. In embodiments the pyrolysis is conducted in a humid air environment. In embodiments the pyrolysis is conducted in an inert gas with water present. In embodiments the products isolated from the pyrolysis are monophenols. In embodiments the products from the pyrolysis are bisphenols. In embodiments the products are a mixture of monophenols and bisphenols. Although the extent to which the o-methoxy groups contribute to the decomposition of these renewable resins is unclear, donation of electron density into the ring likely lowers the decomposition temperature to a regime in which generation of phenolic products is favored over simpler decomposition products such as $CO_2$.

Sustainable phenols represent an important feedstock for new polymers and composite materials. Unlike petroleum sourced chemicals, naturally derived products are often structurally diverse with this diversity sometimes affecting a variety of properties including thermal and oxidative stability. On a positive note, the functional groups present in natural phenols can be an advantage, allowing for simplified, atom-economic synthetic procedures and imparting unique behavior to resins. In this context, the current invention shows that the renewable phenol eugenol is a viable candidate for the generation of high-performance thermoset resins. Another unique aspect of the invention is the ability to recycle eugenol-based thermoset resins via a controlled pyrolysis process. This advance greatly improves the sustainability of these naturally derived resins.

In addition to cyanate esters, a wide variety of thermoset and thermoplastic materials can be synthesized from eugenol. Similar to the results obtained for the cyanate ester, these materials have unique properties due to the four-carbon aliphatic chain linking the aromatic rings together.

To expand the potential applications of this resin it became of interest to investigate blends of the cyanate ester with a thermoplastic that was also prepared from eugenol. In this manner a 100% bio-based composite material would be realized. Although cyanate esters have a number of physical properties that make them desirable in high performance applications, one of their drawbacks and thermoset materials in general, lies in their modest fracture resistance. Toughening approaches for thermosets date back to the late 1960s, where rubber was shown to improve the fracture strength of epoxy resins. More recent studies have explored the use of reactive rubbers to improve the toughness of cyanate esters, esters, however, the use of these materials led to significant reductions in both the Tg and mechanical strength. In general, elastomeric modification has been shown to decrease elastic modulus, yield strength, and creep resistance. Furthermore, elastomer modification of highly cross-linked thermosets, such as cyanate esters, is not an effective approach since matrix yielding is the dominant toughening mechanism. To mitigate these issues, the effects of blending cyanate esters with various thermoplastic resins, including poly(ethylene phthalate), poly (ether imide), polysulfones, and polycarbonates have been studied. In most cases the thermoplastic phase separates during cure of the cyanate ester with toughening of the bulk material dependent on the resulting morphology. The morphology of the material is affected by the composition and molecular weight of the thermoplastic, cure temperature, kinetics, and pressure, among other factors.

The formation of a micro-sized particulate phase having a majority composition of the modifying agent is widely considered to be the most effective morphology for imparting toughness to thermosets. However, this approach to toughening relies on reaction-induced phase separation which is sensitive to cure temperature. During the production of composite parts from highly exothermic cure, significant temperature gradients cannot be avoided and practical control of morphology is difficult to achieve. In contrast, morphologies that allow alternative toughening mechanisms and are not dependent on cure temperature may be useful for composite part fabrication. For example, sub-micron phase separation that results in domains smaller than optical wavelengths of light or interpenetrating networks have also been shown to provide augmented fracture strength. In one study, polycarbonates blended with epoxy resins were shown to be completely miscible upon cure at loadings of up to 12%. Homogenous formulations of this type had improved flexural modulus compared to related heterogeneous blends. Another study on phenoxy/epoxy blends showed that at high epoxy cure rates, homogenous networks were produced that demonstrated higher fracture toughness compared to heterogeneous morphologies, at some expense to blend Tg. This effect has also been observed with polycarbonate/cyanate ester blends. Loadings of up to 50% polycarbonate with cyanate esters have been shown to form single phase interpenetrating networks with improved toughness. There are two keys to achieving this morphology. First, the modifying polymer's structure should closely match that of its intended thermoset host. Second, the molecular weight of the thermoplastic should be kept relatively low, both to generate a homogenous network and to limit viscosity increases, thus having minimal effects on fiber reinforced composite processing.

Polycarbonates (EPC) were prepared by reaction of the bisphenol with triphosgene in pyridine at room temperature. The product was isolated as a white solid by precipitation in water followed by a methanol wash and reprecipitation.

The miscibility of EPC and the cyanate ester along with the cure behavior and morphology of the blend was evaluated by Small Angle Laser Light Scattering (SALLS). The overall scattering intensity as a function of film temperature was integrated. 20% polycarbonate does not inhibit cyanate ester crystallization as evidenced by the relatively high scattering intensity at room temperature. Cross-polarized microscopy confirmed the crystallinity of the film. A significant decrease in the intensity of the scattered light was observed at the melting point of the cyanate ester resin which was depressed by nearly 20 degrees compared to the pure resin. After this initial drop in intensity, no further change in scattering intensity was observed either during or after the cure of the cyanate ester. The lack of a significant increase in the intensity of scattered light indicates that no phase separation occurred at length scales comparable to the wavelength of the incident light. To provide further evidence, a DSC experiment was conducted with the blended material. The DSC scan showed the initial glass transition temperature of the polycarbonate and the melting transition of the cyanate ester, as well as complete cure on heating to 350° C. On completion of cure and a second scan to establish a baseline, the DSC sample was removed from its container, examined, and found to be optically clear. Although a distinct glass transition temperature was not observed after complete cure, as is sometimes the case for thermosetting network polymers, the combination of DSC and SALLS data clearly indicate that no phase separation takes place during cure.

To further characterize the cure behavior of the blend, an 80:20 (cyanate ester:polycarbonate) blend was cured and then evaluated by TMA. As expected based on the SALLS and DSC data, only one $T_g$ was observed at 132° C. (tan δ) compared to the $T_g$ of the pure cyanate ester (186° C.-tan δ) and that of the polycarbonate (71° C.-DSC). This value is similar to that predicted from the Fox relation (140.5° C.) in which the K-parameter is estimated as $T_{g1}/T_{g2}$ in the Gordon-Taylor equation. The presence of only one distinct $T_g$ provides additional support for the existence of a homogenous network.

To investigate the lack of phase separation during cure, an end-group analysis of the polycarbonate was conducted. The synthesis of the polycarbonate should yield phenolic end-groups which may react with cyanate esters to give imidocarbonate linkages. To quantify the amount of residual phenolic end-groups, the polycarbonate was allowed to react with TBDMSCl in pyridine/triethylamine and was then worked up by precipitation in methanol. $^1$H NMR spectroscopy of the product revealed incorporation of TBDMS in the product. By comparing the integrals from the methoxy groups to those of the tert-butyl group on the endcaps, a molecular weight of 9575 daltons was calculated. This agrees reasonably well with the GPC results ($M_n$=8360) and may be higher due to the reprecipitation steps which would be expected to reduce the amount of lighter oligomers. To determine if any chemical grafting was taking place during the cure reaction, a mixture of the polycarbonate and the cyanate ester were cured to form a homogenous puck. The puck was then repeatedly extracted with warm $CH_2Cl_2$ and after evaporation, the extract was weighed. In the extraction experiment, 160 mg of the cyanate ester and 38 mg of the polycarbonate were used. After extraction, the total mass accounted for in both fractions was 195 mg or 98.5% recovery. The mass of the polycarbonate extract was 42 mg, while the residual cured cyanate ester weighed 153 mg. The ease of extraction and essentially quantitative recovery of the polycarbonate proves that no significant reaction between polycarbonate end-groups and the cyanate ester resin occur. Instead the relatively low molecular weight of the polycarbonate allows for the formation of a homogenous system without covalent bonding. The relatively low molecular weight of the polymer and the flexible 4-carbon chain between aromatic rings are likely important structural characteristics for the formation of the homogenous network.

EXPERIMENTAL SECTION

General:

Eugenol, Grubbs' first generation catalyst, cyanogen bromide and triethylamine were purchased from Sigma Aldrich and used as received. Anhydrous ether was obtained from Fischer Scientific and used as received. NMR spectra were collected on a Bruker Avance II 300 MHz NMR spectrometer. Samples were prepared in $CDCl_3$ and spectra were referenced to the solvent peaks ($\delta$=7.26 and 77.16 ppm for $^1H$ and $^{13}C$ spectra, respectively). Fourier Transform Infrared Spectroscopy (FT-IR) was carried out using a Thermo Nicolet Nexus 6700 FTIR equipped with the Smart iTr attenuated total internal reflection (ATR) accessory, single bounce diamond crystal. The detector type was a liquid nitrogen cooled MCTA. FTIR spectra are an average of 32 scans, at 4 $cm^{-1}$ resolution, and have been baseline and background corrected. Elemental analysis was performed by Atlantic Microlabs Inc. Norcross, Ga.

Example 1

(E/Z)-4,4'-(but-2-ene-1,4-diyl)bis(2-methoxyphenol) (1)

Eugenol (25.88 g, 158 mmol) was combined with Grubbs' first generation catalyst (0.532 g, 0.4 mol %) under a nitrogen atmosphere to form a thick purple solution. Immediate evolution of ethylene was observed. The flask was then placed under reduced pressure (20 Torr) for 48 hours with stirring to yield a thick resinous mass. The resulting solid was dissolved in 1 liter of 1 M NaOH and filtered through a celite pad to remove a dark black precipitate. After filtration, the solution was acidified with concentrated HCl which resulted in the precipitation of a pale gray solid. The solid was collected by filtration, washed with water and air-dried overnight. The solid was then dissolved in $CH_2Cl_2$, washed with water, and the organic layer dried over $MgSO_4$. The solvent was then removed in vacuo to yield 22.24 g of product (93% yield).

Example 2

4,4'-(butane-1,4-diyl)bis(2-methoxyphenol) (2)

1 (22.24 g, 74.1 mmol) was dissolved in 150 mL of anhydrous ethanol. The solution was transferred to a glass bomb and 0.5 g of 10° % Pd/C was added. The mixture was shaken under 40-50 psi hydrogen for 3 h. The product mixture was filtered through celite and the solvent removed in vacuo to yield a thick oil in nearly quantitative yield. Recrystallization from hot ethanol/water or ethanol/ether solutions provided analytically pure material. Higher purity material was obtained by vacuum sublimation. $^1H$ NMR ($CDCl_3$) $\delta$ 6.90-6.82 (m, 2H, Ph), 6.73-6.65 (m, 4H, Ph), 5.61 (bs, 2H, Ph-OH), 3.89 (s, 6H, —OMe), 2.66-2.53 (m, 4H, —CH2), 1.72-1.61 (m, 4H, —CH2). $^{13}C$ NMR ($CDCl_3$) $\delta$ 146.5 (2C, Ph), 143.7 (2C, Ph), 134.7 (2C, Ph), 121.1 (2C, Ph), 114.3 (2C, Ph), 111.18 (2C, Ph), 56.0 (2C, —OMe), 35.6 (2C, —$CH_2$), 31.4 (2C, —$CH_2$). Anal. Calcd for $C_{18}H_{22}O_4$: C, 71.50; H, 7.33. Found: C, 71.80; H, 7.47.

Example 3

1,4-bis(4-cyanato-3-methoxyphenyl)butane (3)

2 (3.33 g, 11.0 mmol) was dissolved in 40 mL ether and 10 mL acetone. The flask was cooled to −50° C. and CNBr (3.02 g, 28.5 mmol) was added as a solid. Triethylamine (2.54 g, 25.1 mmol) was then added dropwise and the mixture was allowed to slowly warm up to 10° C. over the course of 1.5 h. The resulting white precipitate was collected on a frit and washed with 2×30 mL ether, 5×30 mL water, and finally 2×20 mL ether. The remaining solid was then dissolved in ethyl acetate, filtered, dried over $MgSO_4$, and refiltered to give a pale yellow solution. Removal of the solvent under reduced pressure gave 1.61 g of off-white solid. The organic washings were then combined, 30 mL ethyl acetate was added, and the mixture was washed with water and the aqueous layer extracted with ethyl acetate. The organic layers were combined, dried over $MgSO_4$, and the solvent removed under reduced pressure to give 2.71 g of a pale yellow oil. 20 mL of ether was added and the flask was cooled to −20° C. to give an additional 1.21 g of product (73% yield). Analytically pure material was obtained by recrystallization from warm ethyl acetate. $^1H$ NMR ($CDCl_3$) $\delta$: 7.26 (d, J=8.3 Hz, 2H, Ph), 6.81-6.74 (m, 4H, Ph), 3.90 (s, 6H, —OMe), 2.70-2.58 (m, 4H, —$CH_2$), 1.70-1.60 (m, 4H, —$CH_2$). $^{13}C$ NMR ($CDCl_3$) $\delta$: 148.5 (2C, Ph), 142.9 (2C, Ph), 140.5 (2C, Ph), 120.6 (2C, Ph), 117.0 (2C, Ph), 113.6 (2C, Ph), 109.8 (2C, —OCN), 56.3 (2C, —OMe), 35.7 (2C, —$CH_2$), 31.0 (2C, —$CH_2$). Anal. Calcd for $C_{20}H_{20}N_2O_4$: C, 68.17; H, 5.72; N, 7.95. Found: C, 68.21; H, 5.88; N, 7.78.

Example 4

Polycarbonate synthesis. In a typical synthesis 1 (1.006 g, 3.3 mmol) was dissolved in 8 mL pyridine and the solution cooled to −20° C. with stirring. Triphosgene (0.384 g, 1.3 mmol) was added and the solution was allowed to warm to room temperature. An additional 4 mL of pyridine was then added to dissolve residual solids. Stirring overnight yielded a thick gray mixture which was poured into 200 mL of water to give a white precipitate. The aqueous supernatant was decanted and replaced with methanol. The mixture was heated to ~50° C. and the solid was dispersed with vigorous stirring for 30 minutes in the methanol solution. The supernatant was decanted off and the solid was dried first under a stream of nitrogen and then in a vacuum oven at 50° C. overnight to yield 0.622 g (57%) of an off-white powder. The polymer was further purified by dissolving in a minimum amount of methylene chloride followed by reprecipitation in methanol. 1H NMR ($CDCl_3$) $\delta$ 7.12 (d, J=8.0 Hz, 2H, Ph), 6.80-6.70 (m, 4H, Ph), 3.87 (s, 6H, OMe), 2.63 (bs, 4H, $CH_2$), 1.67 (bs, 4H, $CH_2$)

Example 5

Polycarbonate endcapping. This procedure was conducted as described in the literature. 100 mg of polycarbonate was dissolved in 6 mL of pyridine. t-Butyldimethylsilyl chloride (0.468 g, 3.1 mmol) was dissolved in triethylamine (1 mL) and this solution was then added to the pyridine solution. The reaction was stirred under nitrogen at 50° C. for 24 h. The solvent was removed under reduced pressure to yield a resinous solid. The solid was then dissolved in a minimum of dichloromethane and precipitated in methanol. After a further reprecipitation, the resulting solid was collected, washed with methanol, and dried in a vacuum oven. The molecular weight of the endcapped polymer was determined by comparing the 1H NMR integrals for the tert-butyl group from the endcap to the methoxy group from the repeat unit. The Mn calculated by this method was 9575 daltons.

Example 6

Solvent extraction of cyanate ester/polycarbonate network. An intimate mixture of 160 mg of 2 and 38 mg of the polycarbonate were added to a circular silicone mold with a diameter of 20 mm and a depth of 2 mm. The mold was heated to 150° C. under a slow flow of nitrogen and then held at that temperature for 30 min. All of the solids melted to form a clear, homogeneous mixture. The temperature was then increased 10° C. every 10 minutes until it reached 210° C. and was then held at that temperature for 24 h. After cooling to room temperature, the puck was removed from the mold, broken into several large pieces, and then transferred to a glass vial. 5 mL of dichloromethane was added to the vial and the sample was gently heated to 35° C. for 15 minutes. The dichloromethane solution was then decanted and any loose pieces of material were collected on a frit. The dichloromethane extraction was repeated 5 times and then the glass vial and frit were placed in a vacuum oven to dry. The dichloromethane aliquots were combined and the solvent removed under reduced pressure to leave a yellow residue. After drying, the insoluble fragments of the puck weighed a total of 153 mg. The soluble residue from the dichloromethane fractions weighed 42 mg. A total of 195 mg of sample (98.5%) were accounted for in the experiment.

X-Ray Diffraction Studies.

X-ray intensity data were collected for omega scans at 296K on a Bruker SMART APEX II diffractometer with graphite-monochromated Mo Kα radiation ($\lambda$=0.71073 Å). Frames were integrated using the Bruker SAINT software package with a narrow-frame integration algorithm. Data were corrected for absorption using the empirical multi-scan method (SADABS), and the structures solved by direct methods using SHELXTL and refined by full-matrix least squares refinement on F2. X-ray data for compounds 1 and 2 have been deposited in the Cambridge Structural Database. (A combined .cif file is included in the supporting information. Compounds 2 and 3 have been deposited in the Cambridge Structural Database as CCDC 942320 and CCDC 942319, respectively)

TGA/FTIR Analysis.

Samples were analyzed using a Thermo Nicolet Nexuus 6700 FTIR interfaced via a heated gas cell and transfer line (held at 150° C. under $N_2$) to a TA instruments Q50 TGA. The TGA was set to ramp from room temperature to 450° C. at a rate of 10 degrees per minute. FTIR spectra were collected every 30 s.

Preparation of Resin Pucks.

Cured polycyanurate samples were prepared by heating the dicyanate ester in a 6 mL glass vial to a temperature just above the melting point of the monomer. Once in the liquid state, the material was degassed at 300 mm Hg for 30 minutes and then poured into silicone molds made from R2364A silicone from Silpak Inc. (mixed at 10:1 by weight with R2364B platinum-based curing agent, degassed for 60 minutes at 25° C. and cured overnight at room temperature, followed by post-cure at 150° C. for 1 hour). The open mold and sample were then placed in an oven at 25° C. under flowing nitrogen and cured following a cure protocol of 150° C. for 1 hour and 210° C. for 24 hours using a ramp rate of 5° C./min. Void-free discs measuring approximately 11.5-13.5 mm in diameter by 1-3 mm thick and weighing 200-400 mg were obtained by this method. The discs were used for thermomechanical analysis (TMA) and hot water exposure tests.

Thermal Characterization.

DSC was performed on a TA Instruments Q200 calorimeter under 50 mL/min. of flowing nitrogen. Samples were subjected to a heat-cool-heat cycle from 40° C. to 350° C. with a ramp rate of 10° C./min. Oscillatory TMA was conducted with a TA Instruments Q400 series analyzer under 50 mL/min of nitrogen flow. The discs were held in place via a 0.2 N initial compressive force with the standard ~5 mm diameter flat cylindrical probe while the probe force was modulated at 0.05 Hz over an amplitude of 0.1 N (with a mean compressive force of 0.1 N). Thermal lag was determined as described previously.[2] To determine $T_g$, the temperature was then ramped to 350° C., cooled to 100° C. and ramped again to 350° C., all at 50° C./min. Discs that were exposed to water were ramped from 40° C. to 350° C., cycled between 100° C. and 200° C. to determine thermal lag and ramped again to 350° C./min, all at 20° C./min. Thermogravimetric analysis (TGA) (without FT-IR) was performed on a TA Instruments Q5000 analyzer with either nitrogen or air flow of 25 mL/min. The samples were heated from ambient to 600° C. at 10° C./min.

Moisture uptake experiments were performed using cured discs of uniform 11.7 mm diameter and 3 mm thickness. Each disk was placed into ~300 mL of deionized water maintained at a temperature of 85° C. for 96 hours. The discs were then removed from the water, gently patted dry with a paper towel, and weighed a minimum of three times (all weights agreed to within 0.0005 g) and then tested via oscillatory TMA to measure "wet" glass transition temperatures.

Embodiments of the invention generally refer to methods for manufacturing thermoplastics or resins from phenol including, isolating eugenol synthetically or from at least one renewable resource, reacting the eugenol with at least one metathesis catalyst to form an unsaturated bisphenol, converting the saturated bisphenol to a resin or a thermoplastic polymer, purifying the resins or thermoplastic polymers, and combining and curing the resins or thermoplastic polymers or resins/thermoplastic polymers with support material to produce composite materials of thermoplastic polymers, resins, or blends of thermoplastic polymers and resins. Embodiments further include hydrogenating the unsaturated bisphenol with at least one hydrogenating catalyst (under a $H_2$ environment) to yield a saturated bisphenol. In embodiments, the saturated bisphenol is converted to a cyanate ester and further includes combining and curing the resins or thermoplastic polymers with support material to produce composite materials having a low water uptake of less than 1.8% and glass transition temperature greater than 186° C.

Another aspect of the invention generally relates to methods for manufacturing thermoplastics or resins from bisphenol including, isolating eugenol synthetically or from at least one renewable resource, reacting the eugenol with at least one metathesis catalyst to form an unsaturated bisphenol, converting the unsaturated bisphenol to a thermosetting resin or a thermoplastic polymer, or first hydrogenating said unsaturated bisphenol to produce a saturated bisphenol and then converting said saturated bisphenol to a thermosetting resin or thermoplastic polymer, purifying the thermosetting resins or thermoplastic polymers, combining and curing the thermosetting resins or thermoplastic polymers or thermosetting resins and thermoplastic polymers with support material to produce composite materials of thermoplastic polymers, resins, or blends of thermoplastic polymers and thermosetting resins, and the composite materials are recycled back to eugenol via a controlled pyrolysis process.

Embodiments include converting the saturated bisphenol to a resin, where the resin is cyanate esters and/or epoxy resins. In embodiments, the metathesis catalyst is a homogeneous and/or heterogeneous catalyst. Embodiments further include separating the heterogeneous catalyst by filtration. Other embodiments further include separating the homogeneous catalyst by extraction of the bisphenol into water with a base and reprecipitation of the bisphenol with at least one acid. Embodiments further include using at least one solvent under pressure of about 0.1-100 atm and with at least one catalyst. In embodiments, at least one solvent is selected from the group consisting of alcohol/THF and the catalyst is selected from the group consisting of Ni, Rd, Pt, Ru, Cu, and any combination thereof. In embodiments, the homogeneous catalysts are selected from the group consisting of Ru, Re, Mo, W based olefin metathesis catalysts, and any combination thereof. In embodiments, the heterogeneous catalysts are selected from the group consisting of Ru, Re, Mo, W based olefin metathesis catalysts on inorganic or polymer supports, and any combination thereof.

In embodiments, the resins are selected from the group consisting of cyanate esters, epoxy resins, benzoxazines, and any combination thereof. In embodiments, the thermoplastic polymers are selected from the group consisting of polycarbonates prepared with reagents including phosgene, triphosgene, diphenylcarbonate, other carbonates, and any combination thereof. In embodiments, the support material is selected from the group consisting of carbon fiber, carbon nanotubes, graphene, glass fibers, metal oxides, clay, nanofibers and any combination thereof and nanotubes or other support material made of materials selected from the group consisting of glass, carbon, and any combination thereof. In embodiments, the curing temperature for resins being dicyanate esters are from about 50° C. to about 350° C.

In embodiments, the thermoplastic polymers are used directly or melt-pressed with said support fibers to yield composite materials or tougheners for thermoset resins. In embodiments, a thermosetting resin and the thermoplastic resin prepared from eugenol are thermally cured to generate a homogenous network. In embodiments, the pyrolysis process is at a temperature range of about 250° C. to about 450° C. In embodiments, the pyrolysis process is in the presence of a hydrolysis catalyst. In embodiments, the recycled phenols or bisphenols are purified by distillation, sublimation, crystallization, or column chromatography.

PROPHETIC EXAMPLES

Prophetic examples are for illustration purposes only and not to be used to limit any of the embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for manufacturing thermoplastics or resins from a bisphenol, comprising:
   isolating eugenol synthetically or from at least one renewable resource;
   reacting said eugenol with at least one metathesis catalyst to form an unsaturated
   bisphenol;
   converting said unsaturated bisphenol to a thermosetting resin or a thermoplastic polymer; or first hydrogenating said unsaturated bisphenol to produce a saturated bisphenol and then converting said saturated bisphenol to a resin or thermoplastic polymer;
   purifying said resins or thermoplastic polymers; and
   combining and curing said resins or thermoplastic polymers or resins and thermoplastic polymers with support material to produce composite materials of thermoplastic polymers, resins, or blends of thermoplastic polymers and resins.

2. The method according to claim 1, further comprising hydrogenating said unsaturated bisphenol with at least one hydrogenating catalyst under a $H_2$ environment to yield a saturated bisphenol.

3. The method according to claim 1, wherein said resin is a cyanate ester and/or epoxy resins and further comprising combining and curing said resins or thermoplastic polymers with support material to produce composite materials having a low water uptake of less than 1.8% and glass transition temperature greater than 186° C.

4. The method according to claim 1, wherein said resin is cyanate esters and/or epoxy resins.

5. The method according to claim 1, wherein said one metathesis catalyst is a homogeneous and/or heterogeneous catalyst.

6. The method according to claim 5, further comprising separating said heterogeneous catalyst by filtration.

7. The method according to claim 5, further comprising separating said homogeneous catalyst by extraction of said bisphenol into water with a base and reprecipitation of said bisphenol with at least one acid.

8. The method according to claim 5 further comprising using at least one solvent under pressure of about 0.1-100 atm and with at least one catalyst.

9. The method according to claim 8, wherein said at least one solvent is a mixture of alcohol and THF and said catalyst is selected from the group consisting of Ni, Pd, Pt, Ru, Cu, and any combination thereof.

10. The method according to claim 5, wherein said homogeneous catalysts are olefin metathesis catalysts based on Ru, Re, Mo, W, and any combination thereof.

11. The method according to claim 5, wherein said heterogeneous catalysts are olefin metathesis catalysts on inorganic or polymer supports based on Ru, Re, Mo, W and any combination thereof.

12. The method according to claim 1, wherein said resins are selected from the group consisting of cyanate esters, epoxy resins, benzoxazines, and any combination thereof.

13. The method according to claim 1, wherein said thermoplastic polymers are selected from the group consisting of polycarbonates prepared with reagents including polysulfones, polyethers, poly ether ether ketones (PEEK), polyesters, alkylphenolics, polyarylates, and any combination thereof.

14. The method according to claim 1, wherein said support material is selected from the group consisting of carbon fiber, carbon nanotubes, graphene, glass fibers, metal oxides, clay, nanofibers, and any combination thereof.

15. The method according to claim 1, wherein said curing temperature for resins ranges from about 50° C. to about 350° C. and said resins are dicyanate esters.

16. The method according to claim 1, wherein said thermoplastic polymers are melt-pressed with said support materials to yield composite materials or tougheners for thermosetting resins.

17. The method according to claim 1, wherein a thermosetting resin and said thermoplastic resin prepared from eugenol are thermally cured to generate a homogenous network.

18. A method for manufacturing thermoplastics or resins from phenol, comprising:
  isolating eugenol synthetically or from at least one renewable resource;
  reacting said eugenol with at least one metathesis catalyst to form an unsaturated bisphenol;
  converting said unsaturated bisphenol to a thermosetting resin or a thermoplastic polymer; or first hydrogenating said unsaturated bisphenol to produce a saturated bisphenol and then converting said saturated bisphenol to a thermosetting resin or thermoplastic polymer;
  purifying said resins or thermoplastic polymers; and
  combining and curing said resins or thermoplastic polymers or resins and thermoplastic polymers with support material to produce composite materials of thermoplastic polymers, resins, or blends of thermoplastic polymers and resins; and
  wherein said composite materials are recycled back to eugenol phenols and bisphenols via a controlled pyrolysis process.

19. The method according to claim 18, further comprising hydrogenating said unsaturated bisphenol with at least one hydrogenating catalyst under a $H_2$ environment to yield a saturated bisphenol.

20. The method according to claim 18, wherein said resin is a cyanate ester and/or epoxies and further comprising combining and curing said resins or thermoplastic polymers with support material to produce composite materials having a low water uptake of less than 1.8% and glass transition temperature greater than 186° C.

21. The method according to claim 18, wherein said pyrolysis process is at a temperature range of about 250° C. to about 450° C.

22. The method according to claim 18, wherein said pyrolysis process is in the presence of a hydrolysis catalyst.

23. The method according to claim 18, wherein recycled said phenols or bisphenols are purified by distillation, sublimation, crystallization, or column chromatography.

* * * * *